United States Patent [19]

Neufeldt

[11] Patent Number: 4,859,135
[45] Date of Patent: Aug. 22, 1989

[54] REFUSE DISPOSAL METHOD AND APPARATUS

[76] Inventor: Jacob J. Neufeldt, P.O. Box 597, Lethbridge, Alberta, Canada, T1J 3Z4

[21] Appl. No.: 237,933

[22] Filed: Feb. 25, 1981

Related U.S. Application Data

[63] Continuation-in-part of Ser. No. 45,668, Jun. 5, 1979, Pat. No. 4,280,780.

[51] Int. Cl.⁴ .................... B65G 67/04; B65F 3/00
[52] U.S. Cl. .................... 414/572; 220/1 T; 222/166; 232/43.5; 414/373; 414/399; 414/680
[58] Field of Search ............ 414/332, 373, 377, 389, 414/399, 403, 404, 406, 409, 421, 572, 573, 680; 232/43.1, 43.5; 222/166, 167, 168; 220/1 T, 260, 322, 83; 49/340; 474/152–154, 156, 157; 298/10, 11

[56] References Cited

U.S. PATENT DOCUMENTS

| | | | |
|---|---|---|---|
| 525,103 | 8/1894 | Heidsieck . | |
| 598,014 | 1/1898 | Schry | 474/154 |
| 1,812,095 | 6/1931 | Hayward | 474/157 |
| 3,057,498 | 10/1962 | Wheat . | |
| 3,137,402 | 6/1964 | Gunn, Jr. . | |
| 3,417,883 | 12/1968 | Felts | 414/340 |
| 3,730,396 | 5/1973 | Harper et al. | 222/166 |
| 3,844,615 | 10/1974 | Anderson | 414/421 |
| 3,902,616 | 9/1975 | Santic et al. | 298/11 |
| 4,213,539 | 7/1980 | Reuter | 220/1 T |
| 4,280,780 | 7/1981 | Neufeldt | 414/572 |
| 4,284,203 | 8/1981 | Mize | 220/260 |

FOREIGN PATENT DOCUMENTS

| | | |
|---|---|---|
| 141851 | 7/1912 | Canada . |
| 168647 | 4/1916 | Canada . |
| 125920 | 5/1916 | Canada . |
| 179248 | 9/1917 | Canada . |
| 210468 | 4/1921 | Canada . |
| 853518 | 10/1970 | Canada . |
| 2337403 | 2/1975 | Fed. Rep. of Germany ...... 414/421 |

Primary Examiner—Robert B. Reeves
Assistant Examiner—Donald T. Hajec
Attorney, Agent, or Firm—Norman P. Soloway

[57] ABSTRACT

A refuse container assembly for storing refuse material at a refuse transfer station is provided with a receptacle, having a refuse storage chamber and a refuse material intake and discharge opening at the upper end of the chamber, mounted on a support frame for pivotal movement about a pivot axis extending transversely of the receptacle between a lower, upright position for receiving and storing thereat refuse material discharged into the opening by refuse collection vehicles and an elevated, at least partially inverted, position for discharging refuse material from the container through the opening into a refuse transportation vehicle, the assembly including a mechanism for pivoting the receptacle between the lower and elevated position, the mechanism including arms mounted on the support frame for pivotal movement about a pivot axis extending transversely of the receptacle, first extendable and retractable actuator having one end connected to the support frame and the other end connected to the arms remote from the pivot axis and second extendable and retractable actuator having one end connected to the receptacle and the other end connected to the arms remote from the pivot axis of the arms, each actuator being retracted in the lower position of the receptacle and being operable, when extended, to pivot the receptacle a portion of the angular displacement between the lower and elevated positions.

29 Claims, 9 Drawing Sheets

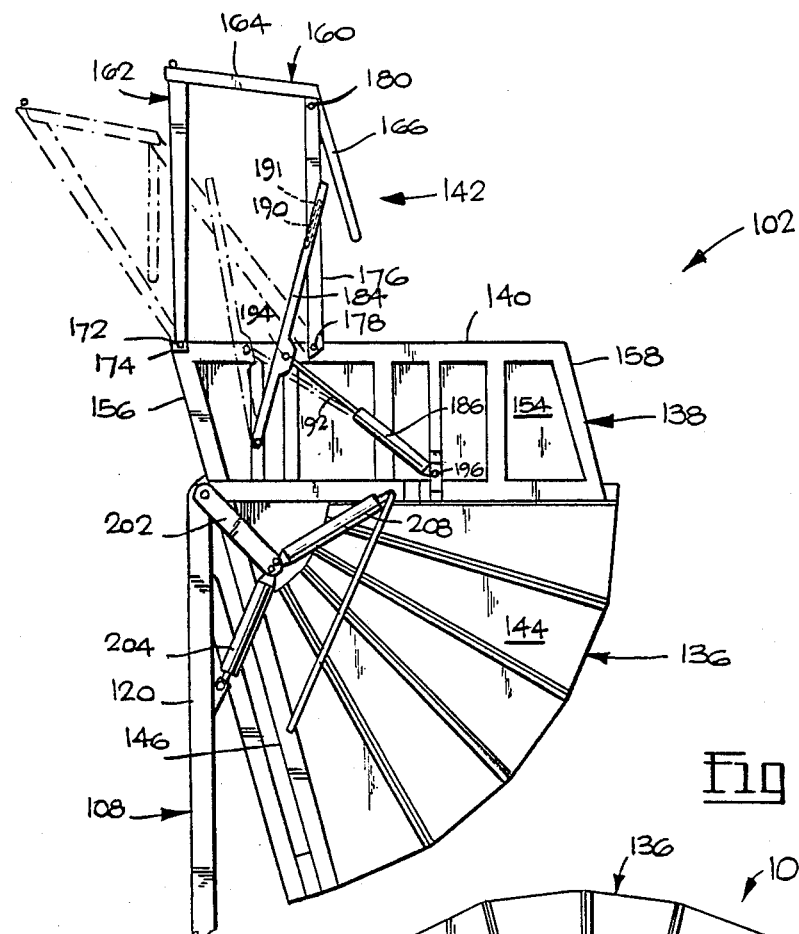
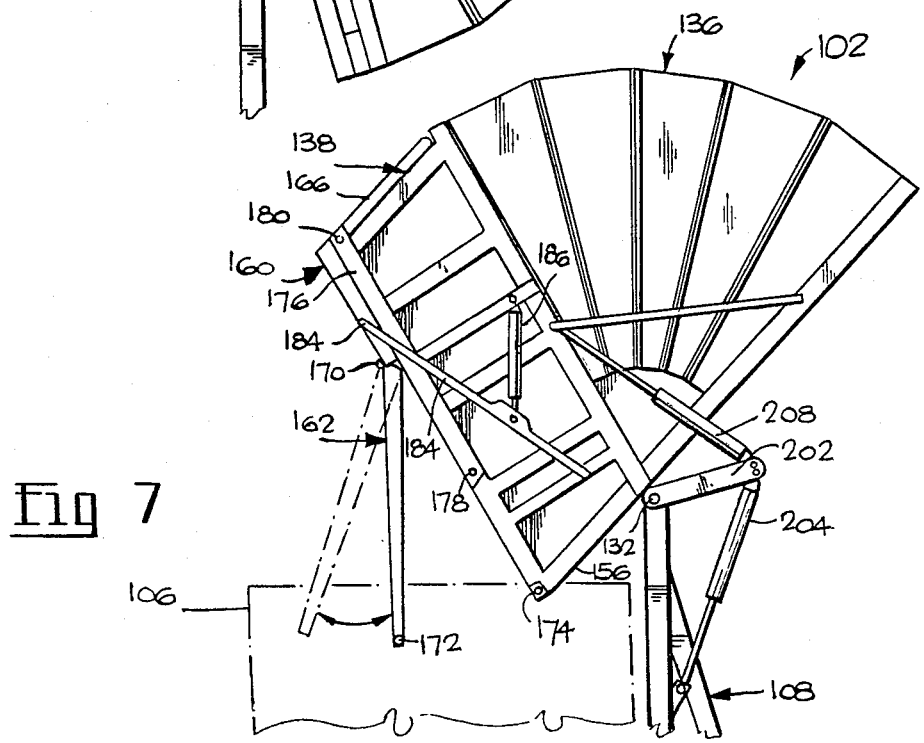
Fig 6
Fig 7

REFUSE DISPOSAL METHOD AND APPARATUS

The present application is a continuation-in-part of my copending application Ser. No. 45,668, filed June 5, 1979 (now U.S. Pat. No. 4,280,780, granted July 28, 1981).

The present invention relates to a system of refuse collection and disposal as well as to a container especially adapted for use in such a system.

A problem with which society has been, is and will continue to face is that of collecting and disposing of refuse. The prime objective of the present invention is to provide a system and an apparatus which renders the task of refuse disposal more simple, efficient and less expensive than conventional systems and apparatuses.

Refuse disposal in general normally involves three separate and distinct phases, namely, collection, transportation and disposal.

The first phase, collection, involves the gathering of refuse from residential and commercial generating locations at predetermined intervals. A number of colelction methods have been used and will be discussed in greater detail below. The collection phase is primarily conducted by public or private haulers. However, in such cases, residents themselves will transport their own refuse to a disposal site.

Public or private haulers normally utilize transportation vehicles to collect refuse from a generation point and convey or transport the refuse to its ultimate and permanent disposal site which may be a sanitary land fill location.

The transportation phase relates to the movement of refuse from the facility where the collection process is terminated to a sanitary land fill location. As indicated earlier, it has been conventional to utilize the collection vehicles to transport the refuse to the disposal site. Since collection vehicles normally have a relatively small capacity, the cost of transporting the refuse from the collection site to the disposal site may be unnecessarily expensive if the distance to be travelled is fairly large.

The disposal phase of the refuse disposal process involves, perhaps, the compaction of refuse and, certainly the covering of collected and transported refuse at a sanitary land fill location in accordance with existing laws and regulations.

The present invention is primarily concerned with the collection and transportation phases of the refuse disposal process. Various collection and transportation schemes have been conceived and have been used. The following is a brief summary of some conventional schemes.

One existing system of collecting and transporting refuse is the "green box system". This system provides containers of three to six cubic yard capacity which are placed at strategic locations for use by local residents. The containers are serviced and emptied regularly with specially designed front end loader vehicles. The vehicles are conventionally equipped with a compaction type body having a volume in the neighborhood of thirty to thirty five cubic yards and a normal gross vehicle weight (GVW) rating of about 49,000 pounds. The vehicles transport their contents to a disposal site.

This system has a decided cost advantage over conventional collection systems in that the collection site development costs are lower than a system using larger containers such as the "roll off system" discussed below. In addition, the containers have lids which reduce wind blowing of refuse. The major disadvantage of this system is that the container size is rather inadequate in the handling of larger items generated at certain times by the general population. In addition, this system makes no provision to receive refuse from a collection vehicle used in the residential collection process and the cost of the long haul may be greater than other systems.

The "roll off system" involves the use of containers having a capacity in the neighbourhood of 30 to 50 cubic yards which, again, are placed at strategic locations in a municipality. This system affords the user the advantage of handling large items and/or large loads to thus overcome one major disadvantage of the "green box system". However, since the container is larger, the opening and closing of large lids or covers creates a problem for the residential or private user and, in addition, this system requires the construction of a more expensive collection site. The containers are themselves carried to and from the ultimate disposal site by means of vehicles especially equipped to load and unload the containers. Thus, in addition to the containers themselves, this system requires special transportation vehicles.

In general, prior systems did not distinguish between collection and transportation of refuse. The container in which the refuse is gathered is either transported directly to the disposal site and then returned or its contents are emptied into a collection vehicle which transports the refuse to the disposal site. Thus, the vehicles serve both as collection as well as transportation means. They have a relatively small capacity and, therefore, the cost of transporting a given weight of refuse tends to be relatively high.

One aspect of the present invention relates to an improved system of collecting and transporting refuse to its ultimate disposal site. In general, the present invention separates the collection and transportation phases of refuse disposal. Collection is confined to a given area of a predetermined size wherein relatively low capacity vehicles collect refuse and convey it to a transfer station within the area. Large capacity transportation vehicles then collect the refuse from a number of transfer stations and convey the refuse to a disposal site.

A further aspect of the present invention is concerned with the transfer station itself and, in particular, with the provision of a transfer container. The transfer container is of moderately high capacity so that it can readily receive refuse from several collection vehicles and is adapted to readily and easily empty its contents into a transportation vehicle. In addition, the transfer container fully encloses the refuse it receives from collection vehicles thereby preventing wind blowing of the refuse and exposure of the refuse to the environment and animals.

These and other features of the invention are described in greater detail in the following description in which reference is made to the accompanying drawings wherein:

FIG. 6 is a view similar to FIG. 5 but illustrating a lid assembly in a position whereby a collection vehicle may discharge its contents into the container;

FIG. 7 is a view similar to FIGS. 5 and 6 but illustrating the container discharging its contents into a transportation vehicle;

DETAIL DESCRIPTION

Figure 1:
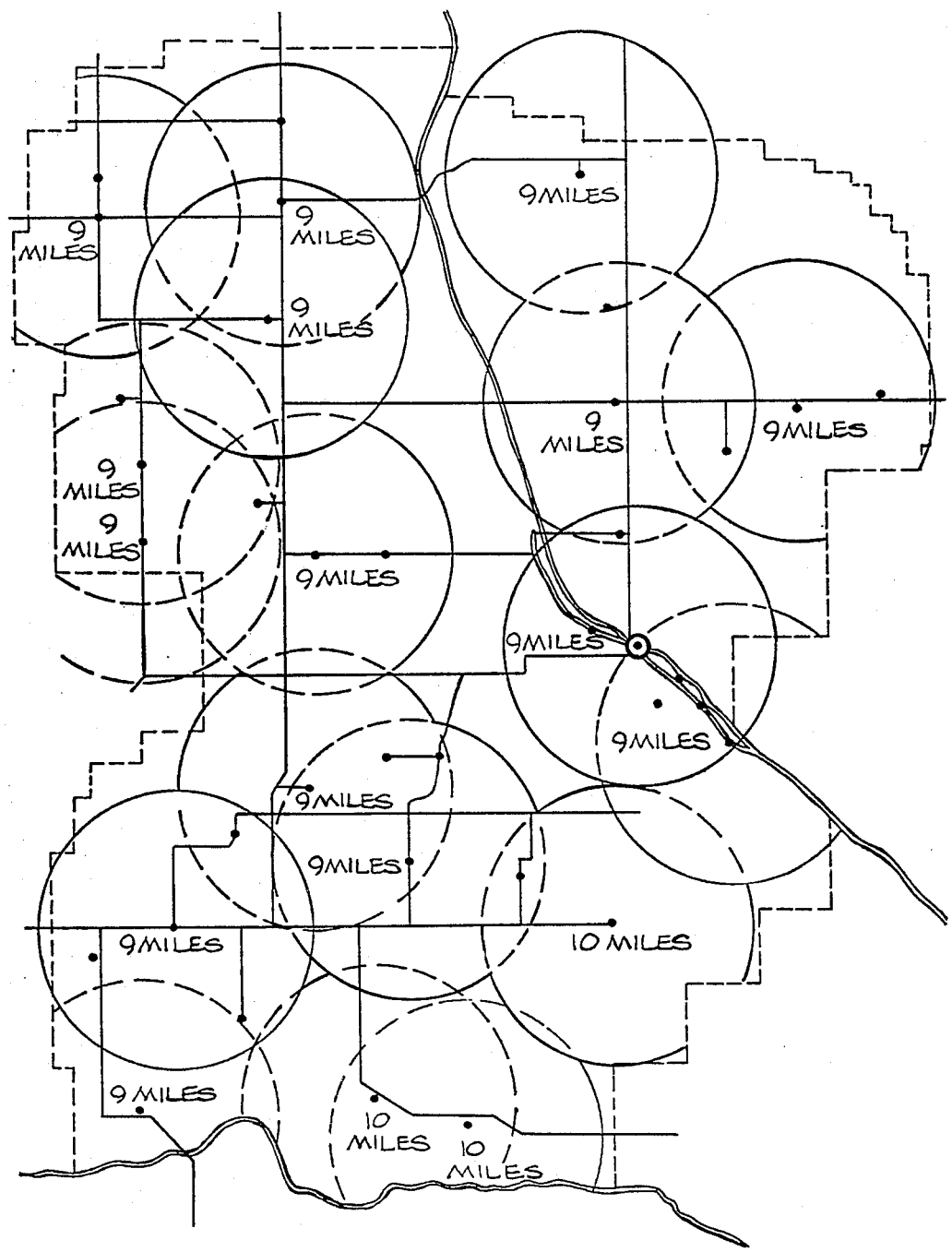
FIG. 1 is a map illustrating a typical area in which refuse is to be collected and which is subdivided into service areas.

FIG. 1 represents a map of a region or municipality in which refuse is to be collected. The circles represent the boundaries of service areas within which, depending upon the population, one or more collection vehicles operate on one or more predetermined days per week. Each service area includes a transfer station having one or more transfer containers to be described in greater detail later. Generally, the transfer containers are adapted to receive refuse from collection vehicles and discharge refuse into transportation vehicles. The number of transfer containers at each transfer station depends upon the quantity of refuse expected to be collected within the service area. The transfer station is located within its service area so as to minimize the "transportation" distance between the collection site and disposal site by the collection vehicles so as to optimize the efficiency of the collection vehicles and crew and minimize fuel consumption. This objective is based upon the notion that refuse collection vehicles tend to be inefficient means for long-distance refuse transportation since the ratio of vehicle weight to refuse weight is relatively high in comparison to other modes of transportation. Furthermore, in conventional refuse collection systems, the refuse collection crew is normally inactive while the collection vehicle is in transit to and from the disposal site. The size of the service area may depend, to some extent, upon the nature of the service area, that is, whether it is an urban or rural area. In any case, the area should not exceed a diameter of about 15 miles. A diameter of 9 or 10 miles is preferred, as indicated in FIG. 1.

The present invention provides for the servicing of the service areas by conventional refuse collecting vehicles which may be of the compacting or non-compacting type. When loaded, the collection vehicles transport their contents to the local transfer station which will be considerably closer than the municipal or regional disposal site. The collection vehicles empty their contents into the transfer containers. The transfer containers have a capacity of several times that of collection vehicles, for example, 2 to 6 times.

Figure 2:
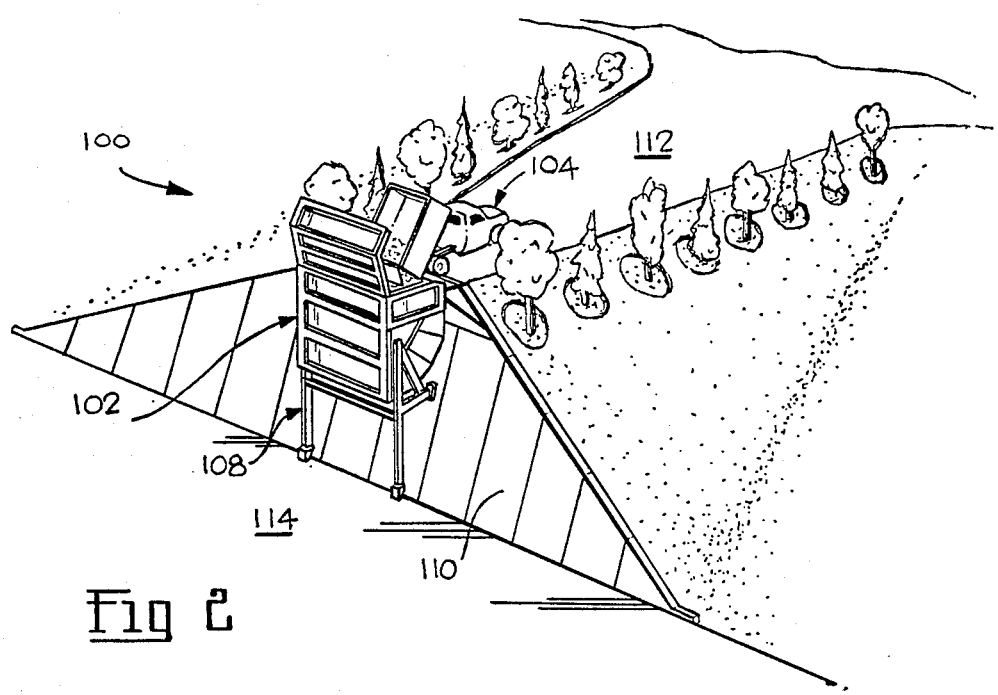
FIG. 2 is a pictorial illustration of a transfer station utilizing the container of the present invention and showing a collection vehicle in the process of discharging its contents into the container.
Figure 3:
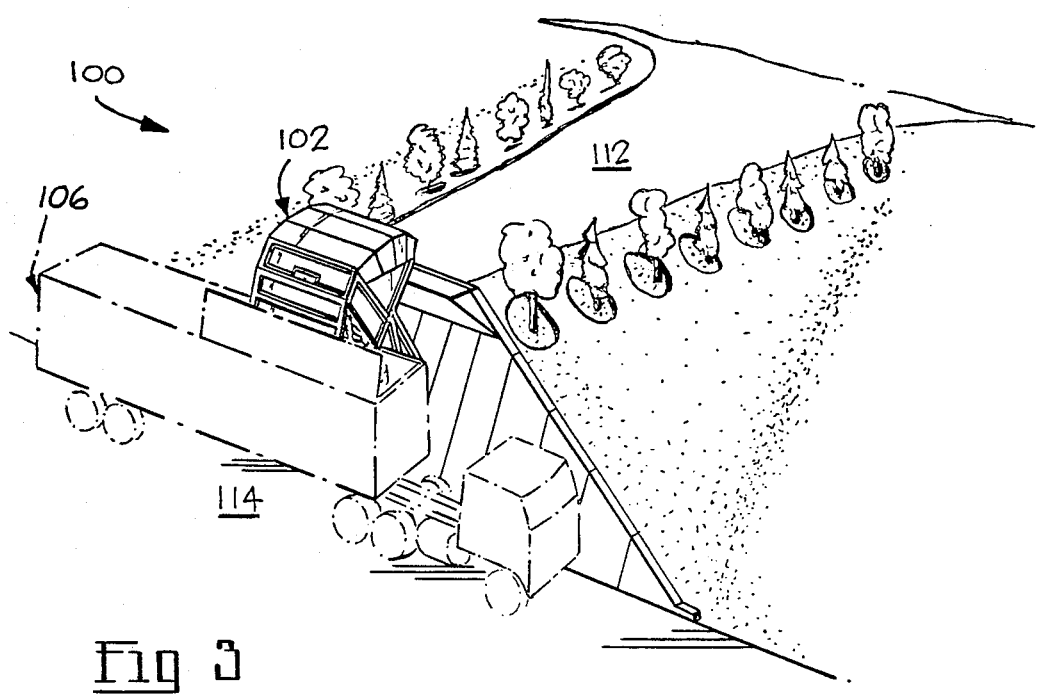
FIG. 3 is a view similar to FIG. 2 but illustrating the container emptying its contents into a transportation vehicle.

FIGS. 2 and 3 pictorially illustrate a transfer station as contemplated by the present invention. As illustrated, the transfer station includes only one transfer container but, as indicated earlier, the transfer station may have several containers if necessary to properly service an area. FIG. 2 illustrates a refuse vehicle emptying its contents into a transfer container.

In accordance with a further aspect of the present invention, high capacity transportation vehicles, such as a tractor-trailer arrangement illustrated in FIG. 3, periodically travel between transfer stations and collect refuse temporarily stored in transfer containers. FIG. 3 illustrates a transportation vehicle receiving refuse from a transfer container.

The transportation vehicles will have a capacity of several transfer containers, that is, two or more times that of a transfer container depending upon the capacity of the transfer container. In general, a transfer container may have a capacity of from 40 to 60 cubic yards while a transportation vehicle will have a capacity of about 100 cubic yards or more. Once filled or once a transportation vehicle has visited the transfer stations within its predetermined route, it transports its contents to a regional or municipal disposal site. High capacity transportation vehicles are a much more efficient means of transporting refuse over relatively long distances inasmuch as the ratio of vehicle weight to refuse weight is considerably less than that of conventional refuse collection vehicles.

Thus, one aspect of the present invention provides a method or system of refuse collection comprising subdividing a municipality or region in which refuse is to be collected into a plurality of service areas with each service area having a diameter of less than about 15 miles and preferably a diameter of 9 or 10 miles, providing a transfer station within each area, each transfer station having at least one transfer container, collecting refuse within each service area on a regular basis utilizing at least one relatively low capacity collection vehicle, transporting the collected refuse into a transfer container, collecting the refuse from a plurality of transfer stations utilizing a relatively high capacity transportation vehicle and transporting the so collected refuse to a local disposal site.

It will be seen that there are several advantages to the above described method or system. Firstly, the provision of strategically located transfer stations in a given collection area ensures that the collection vehicles are collecting refuse rather than merely transporting refuse. Not only does this render the collection vehicles more efficient, it is also more economical in terms of refuse weight per vehicle weight dollar. It is also more economical in terms of the collection crew which is occupied a greater percentage of the time.

Secondly, because of the provision of special transfer containers to be described later, the nature of the transfer station, the disposal site for collection vehicles, is neat and tidy and the refuse disposed thereat is sealed from the elements and environment. Thus, there is a reduced likelihood that vehicles or local residents utilizing the transfer station are apt to be damaged or injured.

Thirdly, the use of large transportation vehicles is the most economical manner in terms of labour and machinery of transporting refuse.

Fourthly, as will become clear later, the transfer of refuse from the collection vehicle to the transfer trailers is readily and quickly accomplished.

Fifthly, the number of vehicles which need attend the ultimate disposal site is considerably reduced and, therefore, the organization of the site is much more readily accomplished and maintained.

A transfer station as invisaged by the present invention will now be described in greater detail.

FIGS. 2 and 3 illustrate a transfer station 100. The transfer station includes an articulated refuse container 102 which serves to temporarily store refuse between visits of collection vehicles 104, local residents and transportation vehicles 106. The container 102 is pivotally mounted on a frame assembly 108 which is rigidly secured to the ground adjacent to and in a steep embankment 110. A gentle ramp 112 leads to the top of the embankment, adjacent the upper end of the container for use by collection vehicles and local residents for placing contents into the container. A roadway 114 running generally perpendicular to ramp 112 is located at the base of embankment 110 on the opposite side of the container from the ramp. The roadway 114 is for use by transportation vehicles.

Generally, the container 102 is formed with a large horizontal opening at its upper end so that collection vehicles may discharge their contents directly into the container. The opening is closed by means of an appropriate lid assembly, various embodiments of which are described later. The lid assembly is movable to one position when it is desired to charge the container and to another position when it is desired to empty the container. The container and its lid assembly ensure that the temporary disposal site is neat and tidy in appearance, free of refuse which might potentially present a safety or health hazard, free of scavenging animals and not susceptable to wind blowing. The container is pivotable from a first position in which it is adapted to receive and store refuse and a second position in which it is adapted to discharge its contents. The container will now be described in greater detail.

With reference to FIGS. 4 to 7, container 102 is mounted on a frame assembly 108. Frame assembly 108 includes a pair of upright columns or members 120 which are secured in the ground adjacent the base of embankment 110 in any suitable manner. A horizontal frame member 122 interconnects uprights 120 approximately midway between their upper and lower ends 124 and 126 while longitudinal, horizontal frame members 128 extend from the midpoint of each upright 120 into embankment 110 and are suitably secured thereto. A brace member 130 connects the upper end of each upright 120 to its respective longitudinal horizontal frame member 128. A horizontal pivot shaft 1332 extends between the upper ends 124 of uprights 120.

Figure 5:
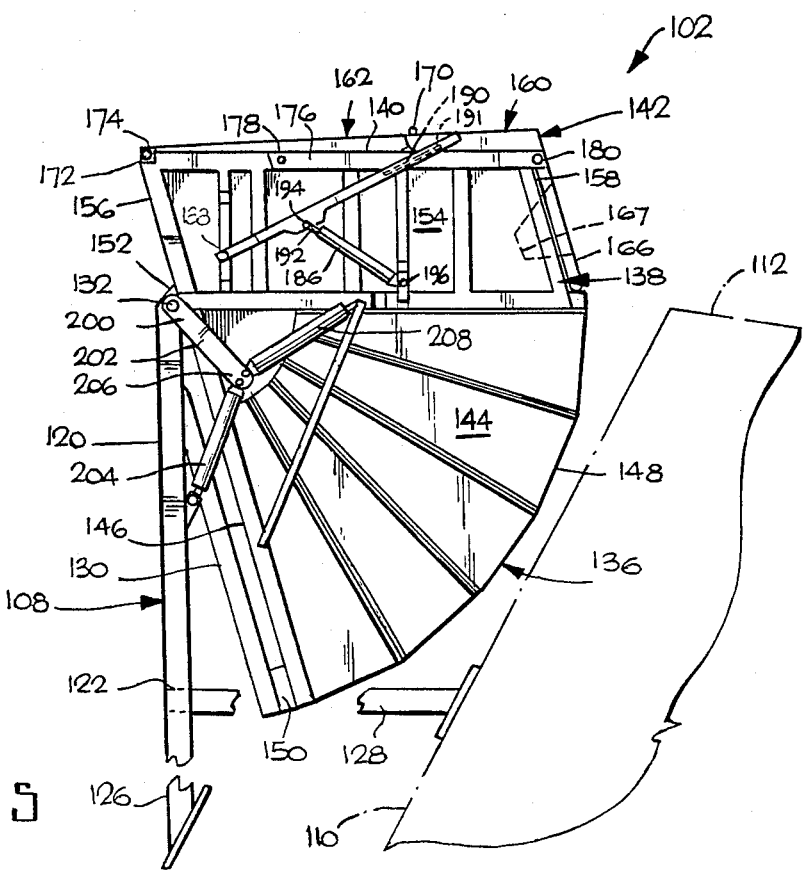
FIG. 5 is a side elevational view of the container of FIG. 4.

As mentioned earlier, container 102 is mounted on shaft 132 for pivotal movement in a vertical plane between a first position illustrated in FIG. 5 wherein the container may receive refuse from collection vehicles and private residence and a second position shown in FIG. 7 wherein the container may discharge its contents into the trailer of a transportation vehicle 106.

The container is formed with a storage section 136 and a hopper section 138. The hopper section, located at the upper end of the storage section, includes a large opening 140 (see FIG. 4) through which refuse is received and discharged. The opening is generally horizontal but is formed with a generally vertical portion at the end thereof adjacent ramp 112. The opening is closed by a lid assembly 142. The lid assembly is movable to different positions depending upon whether it is desired to charge or discharge the container. Various lids assembly configurations will be described later.

The storage section, which may have a capacity in the neighbourhood of about 40 to 60 cubic yards, is formed with a pair of side walls 144, an inclined rearward wall 146 and a forward wall 148. Forward wall 148 is shaped so as not to interfere with the embankment during pivotal movement of the container but otherwise may be of any desired shape such as the generally arcuate shape shown in the drawings. The rearward wall 146 is inclined with respect to the vertical so as to reduce the angular travel of the container to ensure complete discharge thereof. Container 102 normally assumes the position illustrated in FIG. 5. In this position, the weight of the container and its contents are borne by a pair of seating blocks 150 connected to braces 130. The seating blocks 150 abut the lower extremity of wall 146. The upper end of wall 146 is provided with appropriate bearing sections 152 which receive pivot shaft 132.

The hopper section 138 is generally a vertical extension of the storage section 136 but may be of any suitable size and shape. The hopper section is formed with a pair of vertical side walls 154 which extend vertically from side walls 144 of the storage section and a rearward inclined wall 156 coplanar with wall 146 of the storage section. The forward marginal edges 158 of the side walls are generally parallel with rear wall 156. It will be noted that the forward end of the hopper section is open. This portion of the refuse receiving opening 140 is provided to permit the rearward end of collection vehicles to be positioned as close as possible to the interior of the container. Thus, the side walls 154 of the hopper section serve to prevent spillage of refuse over the side of the container and prevent wind blowing of refuse while the collection vehicles discharge into the container. It will be apparent that the marginal edges of the hopper walls define the intake and discharge opening 140.

FIGS. 4 to 7 illustrate one embodiment of a lid assembly. In this embodiment, the lid assembly includes two pivotally interconnected lid members which are adapted to overlie the entire opening 140. The lid assembly is movable from a closed position illustrated in FIG. 5 to a first open position for permitting charging of the container. The assembly is movable to the first open position by means of hydraulic cylinders and levers described hereinbelow. The assembly is also movable to a second, at least partially open position under the influence of gravity to permit discharging of the container.

Lid assembly 142 includes two lid members 160 and 162 which overlie the marginal edges of the hopper. Lid member 160 is formed with a pair of rigidly interconnected panels 164 and 166. Panel 164 covers the forward end of the horizontal portion of the opening while panel 166 covers the inclined or generally vertical portion of the opening. Lid member 162 is generally coplanar within panel 164 in the closed position of the assembly and covers the rearward end of the opening. Panel 166 is formed with a small pivotable chute 167 for use by local residents in manually feeding small quantities of refuse into the container.

Lid members 160 and 162 are pivotally interconnected along their adjacent marginal edges by any suitable arrangement for movement about transverse axis 170. The other transverse marginal edge of lid member 162 carries transverse, outwardly directed pins 172, each of which is releasably received in a seat 174 formed at each end of the upper edge of rearwall 156.

Figure 4:
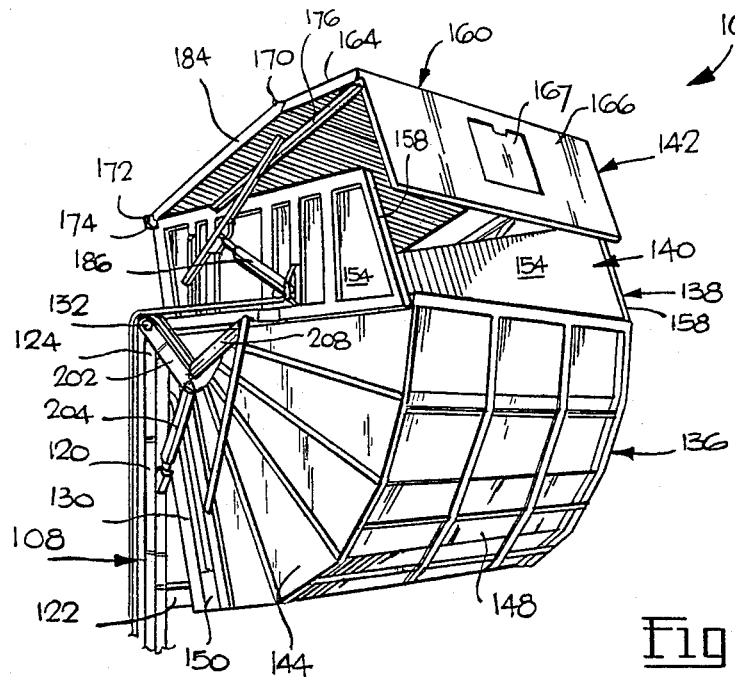
FIG. 4 is a perspective view of an articulated refuse container for use at a transfer station.

The lid assembly is pivotally connected to the hopper section by a pair of arms 176, one arm on each side of the container. The rearward end of each arm is pivotally connected to a wall 154 by a pin 178 while the forward end is pivotally connected to a side edge of panel 166 by a pin 180. In the normal position of the lid asssembly and container, the arms are generally parallel to the plane of the lid members as shown in FIG. 5. Thus, counter-clockwise movement of arms 176 from the position illustrated in FIG. 5 will move the lid assembly upwardly and rearwardly of the hopper opening with the two lid members pivoting relative to one another about axis 170 and the rear lid member pivoting about pins 172 in seats 174, as illustrated in FIGS. 4 and 6. The distance between the pivot axis of arms 176 is equal to that of lid member 162 and the arms and member 162 are parallel to one another so that the arms 176, lid member 162, lid member 160 and hopper side walls 154 together define a parallelogram arrangement.

Any suitable means for actuating arms 176 may be provided. One such means is illustrated in FIGS. 4 to 7 and includes a second pair of arms 184 and a pair of hydraulic cylinders 186, one of each being associated with each arm 176. One end of each arm 184 is pivotally connected to side wall 154 by a pin 188 while the other end of arm 184 is pivotally and slidably connected to arm 176 by a pin 190. Pin 190 is secured to arm 176, approximately midway between its ends, and extends into an elongated, longitudinal slot 191 in arm 184. Slot 191 provides for relative movement between the arms. Piston rod 192 of cylinder 186 is pivotally connected to arm 184 at 194 while the opposite end of the cylinder is pivotally connected to a side wall of the container as at 196.

When it is desired to charge the container, the lid assembly is moved to its first open position (FIG. 6) by actuating cylinders 186. In so doing, piston rods 192 move outwardly and rearwardly to cause arms 184 to pivot in a counter-clockwise direction about pins 188. This action, in turn, transmits a force to arms 176, causing them to rotate in a counter-clockwise direction and move lid members 160 and 162 away from the opening as explained earlier. In particular, member 162 will pivot in a counter-clockwise direction about the axis of pins 172 while members 160 and 162 will pivot relative to one another about axis 170. When the collection vehicle has been discharged, the cylinders are deactuated or reversed and the lid assembly is returned to its normal position.

When it is desired to discharge the container, the container is rotated to the position shown in FIGS. 3 and 7 by means to be described hereinbelow. In this position, lid member 160 is maintained in a closed position by means of a fluid pressure in cylinders 186. However, as illustrated in FIG. 7, once the container reaches a predetermined angular disposition, pins 172 are free to move away from seats 174 and permit rear lid member 162 to move away from the marginal edges of the hopper section in a clockwise direction about axis 170.

Thus, the contents of the container are then free to slide outwardly of the container. It will be seen that lid member 162, in addition to removably closing the opening of the hopper, also serves as a windshield during the discharge process.

The container may be pivoted about shaft 132 in any suitable manner. FIG. 5 illustrates a container actuating arrangement. This arrangement utilizes a pair of hydraulic cylinders and an arm associated with each upright member.

As illustrated in FIG. 5, one end 200 of an arm 202 is rotatably mounted at one end of pivot shaft 132 and extends downwardly and forwardly therefrom. A first hydraulic cylinder 204 is pivotally connected between the other end 206 of arm 202 and upright 120 and a second hydraulic cylinder 208 is pivotally connected between end 206 of arm 202 and container 102 as shown. Preferably, the angles subtended between the axis of the cylinders and the centerline of the arm are equal.

The hydraulic cylinders 204 and 208 may be operated in unison or independently in order to raise and lower the container.

It will be understood that a single hydraulic cylinder can replace the pair of hydraulic cylinders as above described on each side of the container. However, the pair of cylinders in tandem are preferred because the applied forces tend to be directed more perpendicularly to arms 202 than the forces applied by a single cylinder arrangement. Thus, the capacity of cylinders may be reduced and the stresses on the various parts may be minimized.

When it is desired to discharge the container, cylinders 204 are actuated to cause arms 202 to pivot in a counter-clockwise direction about shaft 132. The force produced by cylinders 204 is transmitted through end 206 of arms 202, through cylinders 208 and their respective piston rods and then to container 102. Thus, arms 202 simply serve a guiding function. Once the piston rods of cylinders 204 have reached their limit of travel, cylinders 208 are pressurized. As the piston rods of cylinders 208 move outwardly, container 102 will pivot in a counter-clockwise direction as viewed in FIG. 5 and the forces produced by the cylinder are transmitted back to column members 120 via end 26 of arms 202 and cylinders 204. It will be appreciated that the cylinders may be actuated in reverse order or in unison as suggested earlier.

Once the container has pivoted through 90 degrees, pins 172 of lid member 162 will unseat. Further pivoting of the container will cause lid member 162 to uncover opening 140. At this point, rear walls 146 and 156 of the storage and hopper sections, respectively, will already by inclined downwardly and rearwardly so that the refuse within the container will already have started to slide toward opening 140. Little further pivoting of the container is then required to fully discharge the container. As shown in FIG. 7, lid member 162 serves to prevent spillage of refuse over the sides of the transportation vehicle while also serving to minimize windblowing of the refuse being discharged.

It is contemplated that the lid assembly lifting cylinders and container lifting cylinders be provided with conventional conduits, control valves, pumps and motors. In order to minimize the cost of the containers, the container lifting hydraulic cylinders may be powered by the hydraulic system of the transportation vehicles. It is also contemplated that the lid assembly lifting cylinders may also be arranged to couple directly into the hydraulic system of collection vehicles.

Figure 8:
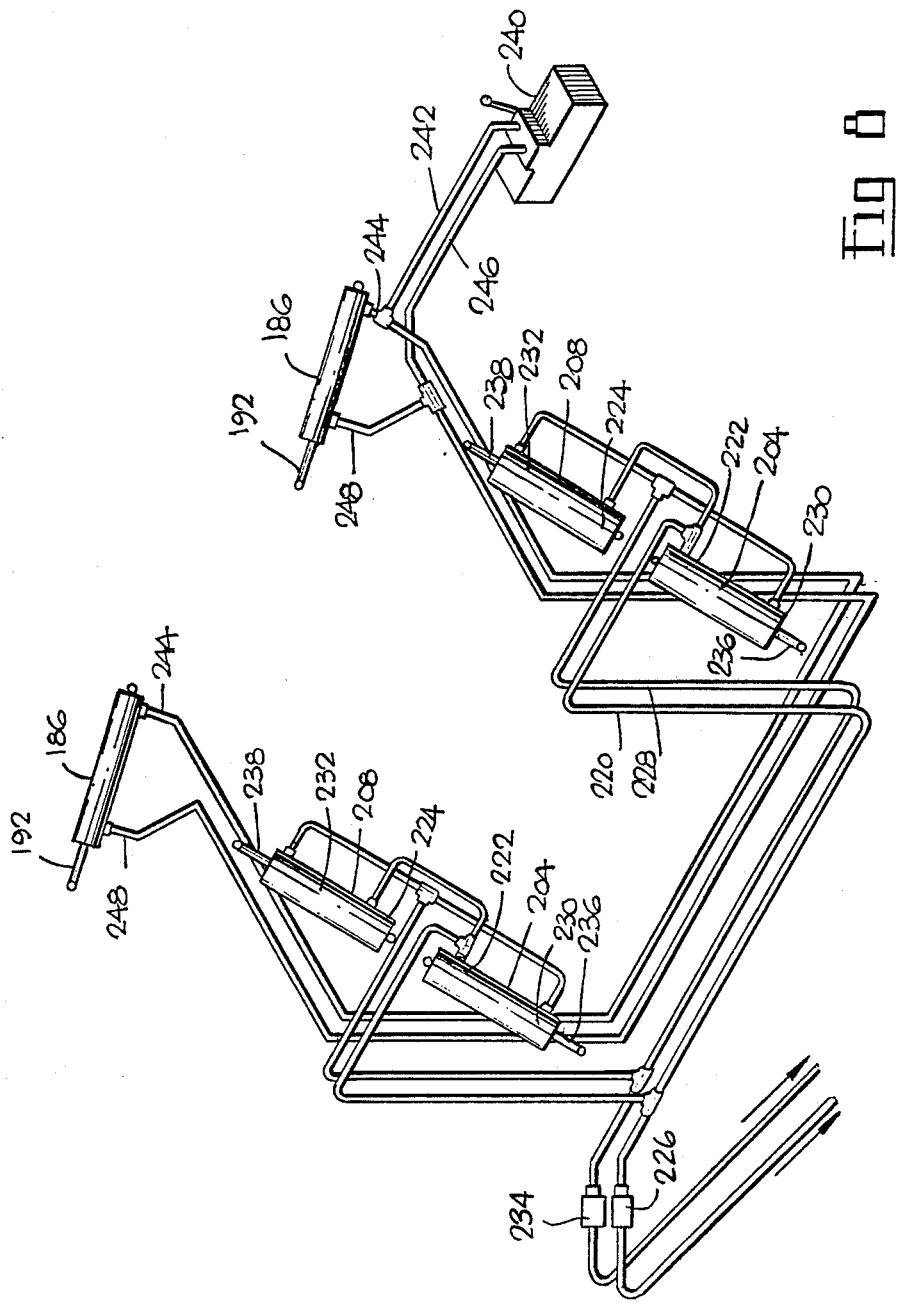
FIG. 8 is a pictorial, diagrammatic illustration of a hydraulic circuitry for actuating the various hydraulic cylinders of the container.
Figure 9:
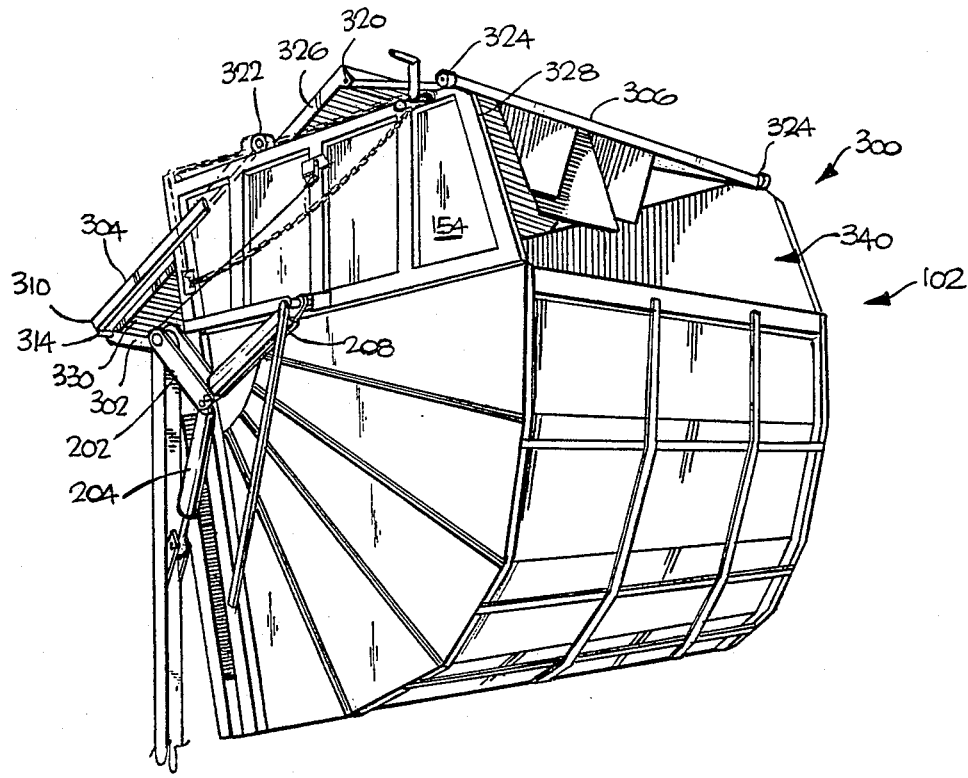
FIG. 9 is a perspective view of a container similar to FIG. 4 but having an alternative lid assembly.
Figure 10:
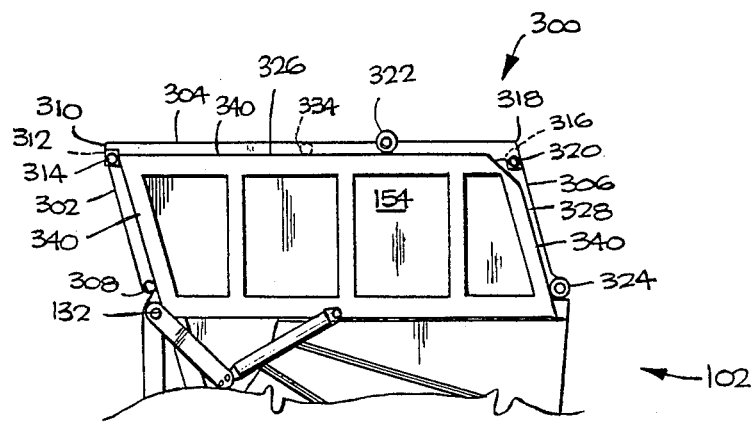
FIG. 10 is a partially broken, side elevational view of the container of FIG. 9.
Figure 11:
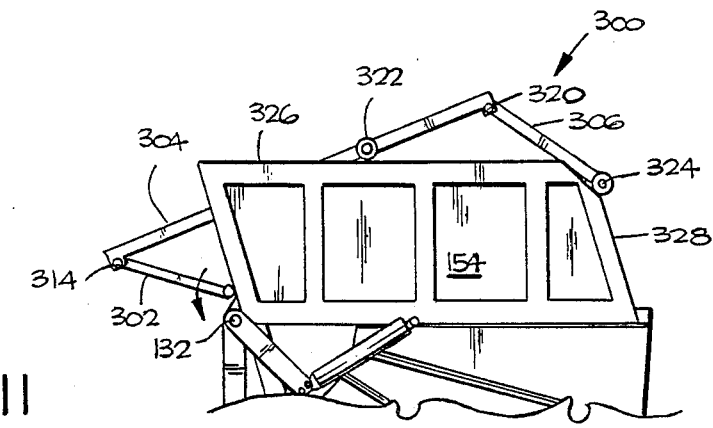
FIGS. 11 and 12 are views similar to FIG. 10 but illustrating the lid assembly in different positions.

FIG. 8 diagrammatically illustrates a hydraulic circuit wherein the container cylinders are adapted to be actuated by the transportation vehicle hydraulic system while the lid cylinders are provided with a separate and independent hydraulic power circuit.

In the arrangement of FIG. 8, cylinders 204 and 208 are adapted to be actuated by the hydraulic systems of a transportation vehicle. A first hydraulic conduit 220 connects adjacent ends 222 and 224 of cylinders 204 and 208, respectively, to a first hydraulic breka-away 226 while a second conduit 228 connects the other ends 230 and 232 of cylinders 204 and 208, respectively, to a second break-away 234. Thus, when conduit 220 is pressurized, piston rods 236 and 238 of cylinders 204 and 208, respectively, will be extended to raise the container and when line 228 is pressurized piston rods 236 and 238 will be withdrawn to lower the container.

Lid containers 186 are provided with an independent hydraulic system having a hydraulic power and control unit 240, a first hydraulic line or conduit 232 connecting ends 244 of cylinders 186 to unit 230 and a second hydraulic line or conduit 246 connecting ends 248 of cylinders 186 to unit 240. As will be evident, the cylinders are connected in parallel. Thus, when conduit 242 is pressurized, piston rods 192 will be extended to raise the lid assembly to the first open position discussed earlier and when line 246 is pressurized, the piston rods will be withdrawn to return the lid assembly to its closed position.

FIGS. 9 to 15 illustrate an alternative lid assembly 300 which tends to be less affected by wind loads because of a lower profile in an open position and which requires less energy to actuate due to a counterbalancing effect by a portion of the assembly as will be explained.

In this embodiment of the lid assembly, certain lid members are provided with rollers which travel along the marginal edges of the side wall of the hopper. Further, the hopper section is modified by removing the rear inclined wall 156 so that the hopper section consists only of side walls 154. This modification provides a generally inverted U-shaped refuse receiving and discharge openings 340 when viewed in side elevation such as in FIGS. 9 to 13.

The lid assembly is movable from a normally closed position (FIG. 10) overlying opening 340 to an, at least, partially open position (FIG. 12) wherein the container may receive refuse from collection vehicles. The assembly also includes a discharge gate for discharging the container as will be explained hereinbelow.

Lid assembly 300 includes three pivotally interconnected, generally flat, rectangular lid members or panels 302, 304 and 306 of tubular and sheet steel construction. Each panel is adapted to overlie the three lengths of opening 340. First panel 302 normally overlies the rearward portion of opening 340 and generally occupies the space previously occupied by rear wall 156. Panel 302 is pivotally connected to pivot shaft 132 along longitudinal marginal edge 308. However, panel 302 may alternatively be pivotally connected to the container itself rather than to the pivot shaft if so desired. Second panel 304 overlies the horizontal, intermediate portion of opening 340 and is pivotally connected along its rearward marginal edge 310 to the upper marginal edge 312 of panel 302 by pins 314. Third panel 306 overlies the front portion of opening 340 and is pivotally connected along its upper marginal edge 316 to the front marginal edge 318 of second panel 304 by pins 320.

Second and third panels 304 and 306 are each provided with a pair of rollers 322 and 324, respectively, one roller being located on either side edge of the respective panels. Rollers 322 and 324 support panels 304 and 306, respectively, and are adapted to travel along the front and upper marginal edges 326 and 328 of side walls 156 of the hopper section.

Figure 12:
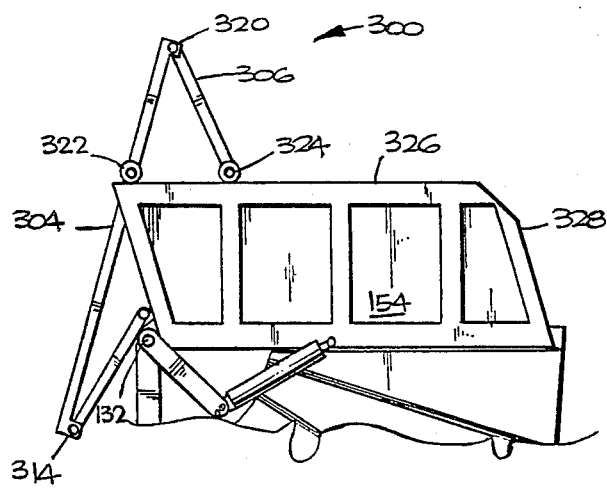

Lid assembly 300 is movable to the position illustrated in FIG. 12 when it is desired to charge the container. The lid assembly may be actuated by any suitable means. A particular means will be described later. In general, the lid assembly may be actuated by applying either a rearwardly directed force to panel 304 or a counter-clockwise torque to panel 302. in either case, panel 302 will pivot in a counter-clockwise direction about its pivotal connection to pivot shaft 182 while panel 304 will travel rearwardly as rollers 322 roll along edges 326 of side walls 154 and simultaneously pivot in a counter-clockwise direction about the axis of rollers 322 to an intermediate position illustrated in FIG. 11. Likewise, panel 306 will follow panel 304 as rollers 324 roll along edges 326 and 328 of side walls 154. An appropriate stop (not shown) may be provided to define the limit of rearward travel of the lid assembly, that illustrated in FIG. 12.

When the lid assembly is in the position illustrated in FIG. 12, refuse collection vehicles may discharge their contents directly into the container. As with the previous embodiment, side walls 154 serve to prevent spillage and reduce wind blowing of refuse. Panels 306 and 304 also serve to prevent spillage and wind blowing of refuse. However, because of the lower profile (area of assembly projecting vertically above the side walls) the wind loading on the assembly is considerably reduced.

Figure 13:
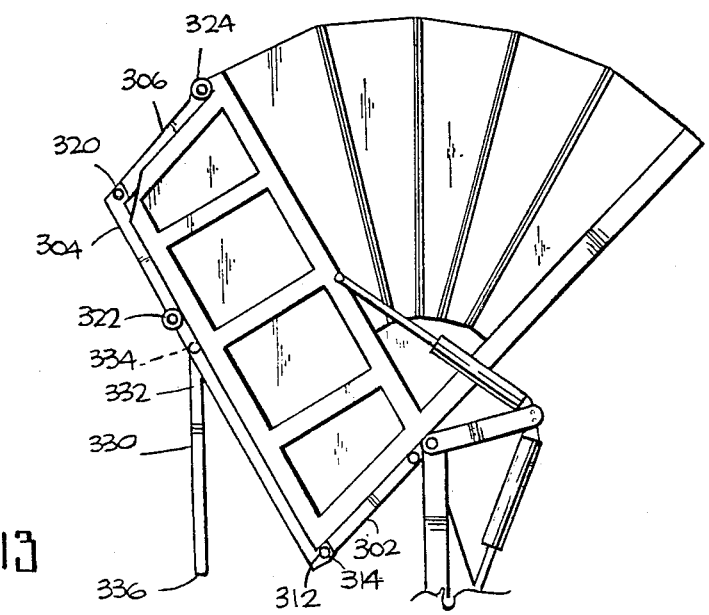
FIG. 13 is a view similar to FIGS. 10 to 12 but illustrating the container in a discharging position.

In order to discharge the container, second panel member 304 is provided with a generally rectangular gate member 330 which extends substantially across the entire width of panel 304 and extends from just rearwardly of rollers 322 to the rearward end thereof. As shown in FIG. 13, the forward end 332 of gate 330 is pivotally mounted to panel 304 by means of pins 334. The rearward marginal edge 336 of gate 330 rests, under the influence of gravity, upon the upper marginal edge 312 of panel 302 when the lid assembly and container are in the position illustrated in FIGS. 10 to 12. However, once the container has been pivoted in a counter-clockwise direction by an amount exceeding 90 degrees such as is illustrated in FIG. 13, gate 330 will pivot about pins 334 and depend vertically downwardly as shown in FIG. 13 permitting discharge of refuse within the container. Thus, gate 330 functions in a manner similar to panel 162 of the previously described embodiment.

Figure 14:
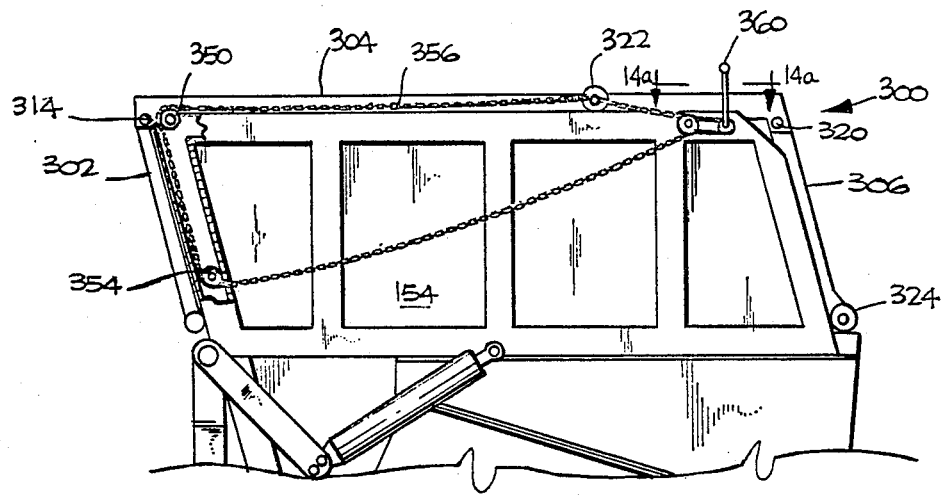
FIGS. 14 and 15 are side elevational views of the container of FIG. 98 illustrating lid actuating mechanisms.
Figure 14A:
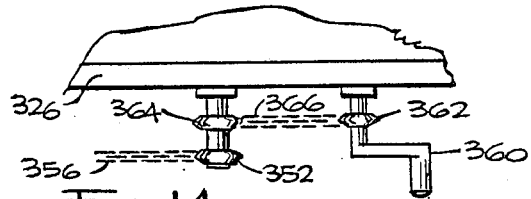
FIG. 14a is a view taken along lines 14a—14a of FIG. 14.

Any suitable means may be provided for retracting lid assembly 300 from its closed position to the open position illustrated in FIG. 12. For example, hydraulic or electric motors, either independently powered, if a source of power is readily available, or powered by the hydraulic or electric system of collection vehicles may be provided. However, an advantage of the lid assembly 300 is that little energy is required to move it between the two above mentioned positions. Accordingly, a manual lid actuating mechanism is feasible. Such a mechanism is diagrammatically illustrated in FIG. 14. As illustrated in FIG. 14, three chain sprockets 350, 352 and 354 are rotatably mounted into each side wall 154 of the hopper section of the container. A chain 356 is trained about sprockets 350, 352 and 354 as shown and its ends are secured in any suitable manner to cross shaft 358 of rollers 322. A crank handle 360 is rotatably mounted at the forward end of one side wall 154 of the hopper section adjacent sprocket 352. A chain sprocket 362 is non rotatably secured to handle 360 while a second chain sprocket 364 is mounted for rotation with chain sprocket 352 as illustrated in FIG. 14A. A second chain 366 is trained about sprocket 364 and 362. Thus, it will be seen that rotation of crank handle 360 in a counter-clockwise direction as viewed in FIG. 14 will tension chain 356 and cause the lid assembly to retract from the closed position towards the open position. Sprockets 352, 362 and 364 are suitably sized to minimize the torque necessary to effect rotation of crank handle 360.

Figure 15:
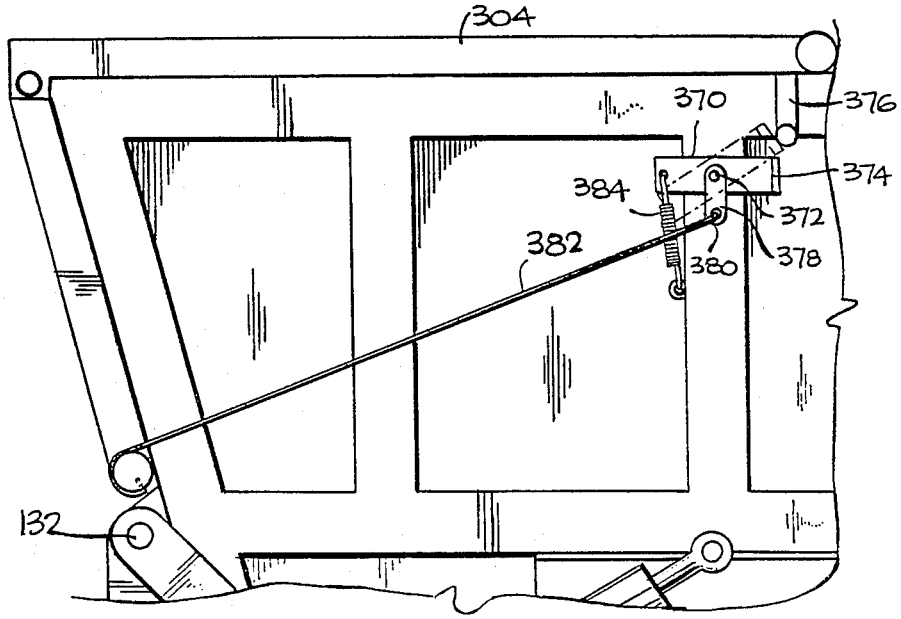

It will be apparent that lid assembly 300 requires means to maintain the assembly in its closed position while the container is being discharged. A suitable means is illustrated in FIG. 15 and includes an L-shaped lever arm 370 pivotally connected intermediate its ends to side wall 154 of the hopper section by means of a pivot pin 372. Lever arm 370 is formed with a transversely outwardly projecting leg 374 which is adapted to engage an abutment 376 secured to panel 304 of the lid assembly. A second lever 378 is rigidly secured at one end to lever arm 370 and depends downwardly therefrom. The free end 380 of lever 378 is connected to one end of a flexible cable 382 while the other end of the cable is partially wrapped around and secured to pivot shaft 132 as shown. A spring 383 has one end connected to the end of lever arm 370 opposite leg 374 and its other end connected to side wall 154 as shown in FIG. 15 and biases lever arm 370 is a counter-clockwise direction.

Cable 382 is adjusted such that leg 374 of arm 370 assumes the position illustrated in solid lines in FIG. 15. In this position, the lid assembly is free to move to and from its closed and open positions to permit charging of the container. However, when the container is pivoted in a counter-clockwise direction towards its discharging position, cable 382 will unwrap from pivot shaft 132 and slacken. In so doing, spring 383 we will be permitted to retract and move lever arm 370 to the dotted line position illustrated in FIG. 15 wherein leg 374 engages abutment 376, thus preventing retraction of the lid assembly. As the container returns to its normal position illustrated in FIG. 10, cable 382 will again partially wrap around shaft 132 and tension. This action will cause lever arm 370 to return to the solid line position of FIG. 15.

While a particular lid assembly locking means has been described and illustrated it will be understood that various alternatives may be provided. For example, appropriate means may be provided to prevent rotation of crank handle 360. Such a means could be manually settable and releasable by the collection vehicle operator.

Figure 16:
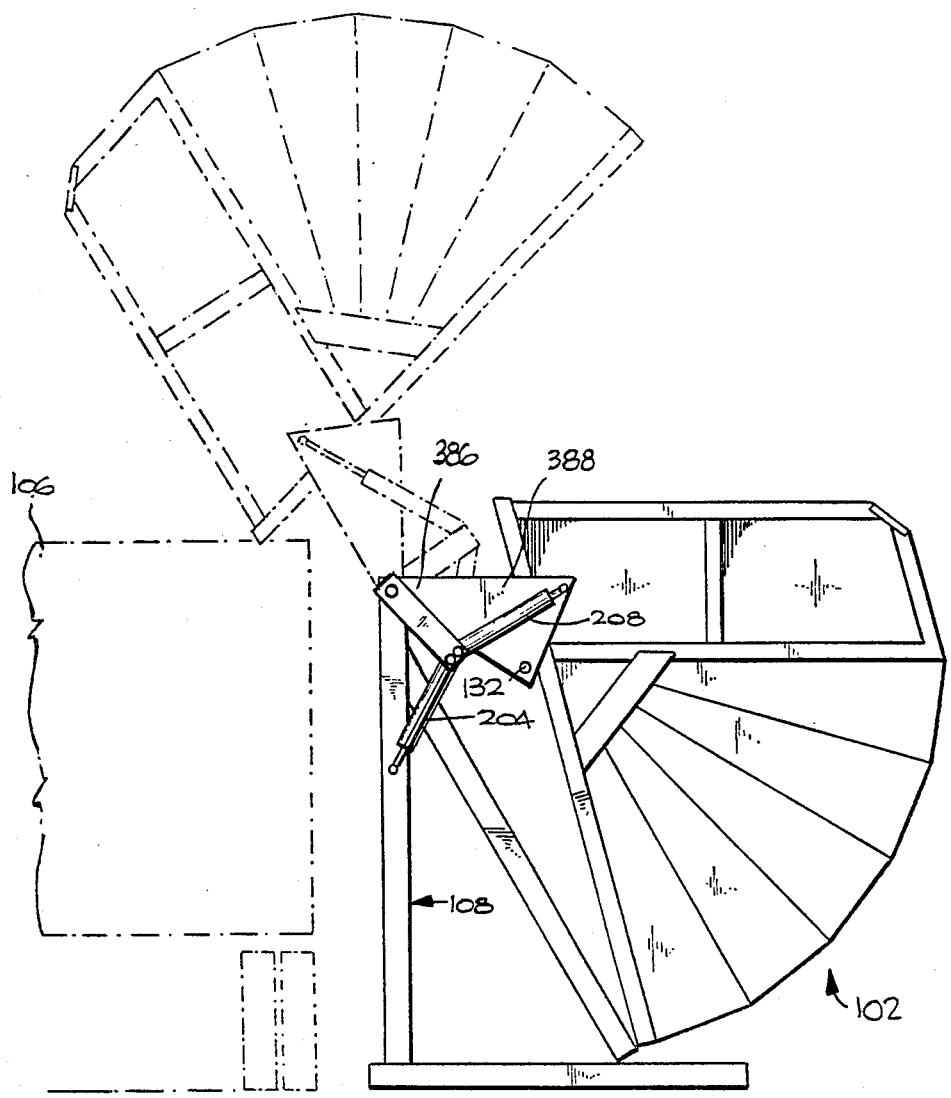
FIG. 16 is an elevation view illustrating an alternative container mounting arrangement.

FIG. 16 illustrates an alternative container mounting arrangement. This arrangement permits the container to be mounted closer to the ground thereby reducing the height of the ramp and associated expenses yet still permits the container to be raised a sufficient height for discharging into a transportation vehicle. This is achieved generally by rearwardly displacing the pivot axis of the container as will as described hereinbelow.

The alternative mounting arrangement illustrated in FIG. 16 utilizes the same hydraulic actuating mechanism described with respect to FIGS. 1 to 9 and, accordingly, the same reference numerals have been used to designate the same or similar elements.

As shown in FIG. 16, the container of the previous embodiments is modified by securing to the opposed ends of shaft 132 and to the side walls 154 of the hopper section a rearwardly extending arm or plate 384. The free end 386 of each arm 384 is pivotally connected to frame 108 at the location thereon where shaft 132 of the previous embodiments is connected. The outer end of the piston rod of each hydraulic cylinder 208 may be connected to the arm 384 as shown in FIG. 16 or may be connected to either the side wall 154 of the hopper section or side wall 144 of the container as shown in ghost FIG. 16. In each of these cases, it will be appreciated that outward displacement of the piston rods of cylinders 204 and 208, as previously described, will cause the container to pivot in a counter-clockwise direction about the pivotal connection of the free ends 386 of arms 384 from the material receiving position illustrated in solid lines in FIG. 16 to the material discharge position illustrated in dotted lines therein. As is evident from FIG. 16, the arms 384 permit the container to be raised well above the side walls of the transportation vehicle while permitting the material receiving opening of the container in its material receiving position at a height which is less than that of the previous embodiments. As a result, the height of the ramp necessary to permit discharging into the container by collection vehicles may be reduced and this, in turn, will tend to reduce the cost of the transfer station.

The particular arrangement used will depend to some extent upon the contour of the land selected for the transfer station. If the location has a hill which would be suitable for a ramp, the arrangement of FIGS. 1 to 9 may be utilized. However, if it is necessary to construct a ramp, the arrangement of FIG. 16 would preferred.

While the container illustrated in the previous embodiments includes a lid assembly, it will be appreciated that there are circumstances wherein a lid assembly would not be required. It is within the spirit and scope of the present invention, for example, that a building could be constructed to enclose the transfer station in its entirety including a least a portion of the ramp and the roadway for the transportation vehicles. In such circumstances, the need of a lid assembly and its associated operative mechanism is not as great.

It should be understood further that the specific configurations of lid assemblies described herein are for illustrative purposes only. Various alternative assemblies can be devised without departing from the spirit and scope of the invention.

The embodiments of the invention in which an exclusive property or privilege is claimed are defined as follows:

1. A refuse container assembly for storing refuse material at a refuse transfer station, comprising:
 a support frame;
 a receptacle having a rearwardly inclined planar rear wall, a front wall, a pair of side walls and a bottom defining a refuse material storage chamber and an open top defining a refuse material intake and discharge opening, first arm means rigidly attached to the receptacle and extending rearwardly from the upper end of said rear wall and secured to said support frame for pivotal movement of said receptacle about a receptacle pivot axis extending transversely of said receptacle and parallel to said rear wall between a lower, upright position on one side of said pivot axis whereat said receptacle is disposed to receive through said opening refuse material discharged from refuse collection vehicles and an elevated at least partially inverted position on the other side of said axis whereat said receptacle is disposed for discharging the contents of said chamber through said opening into refuse transportation vehicles;

Means for pivoting said receptacle between said lower and elevated positions, said pivoting means including:

second arm means having one end secured to said support for pivotal movement about said receptacle pivot axis and extending forwardly thereof;

first hydraulic cylinder means, including extendable and retractable piston rod means, having one end connected to said support frame and the other end connected to said second arm means remote from said pivot axis; and second hydraulic cylinder means, including extendable and retractable piston rod means, having one end connected to said receptacle and the other end secured to said second arm means remote from said pivot axis.

2. A refuse container assembly as defined in claim 1, further including:

a lid assembly overlying said opening and being moveable from a first position normally closing said opening and a second position opening said opening; and actuating means for moving said lid assembly between said first and second positions.

3. A refuse container assembly as defined in claim 2, said lid assembly including a first lid member overlying a portion of said opening pivotally connected to said receptacle and being moveable to an open position to permit charging of said storage chamber and a second lid member overlying the balance of said opening being moveable to an open position to permit discharging of the contents of said chamber.

4. A refuse container assembly as defined in claim 3, said second lid member being connected to said first lid member for relative pivotal movement of said lid members about adjacent marginal edges extending generally parallel to the pivotal axis of said container.

5. A refuse container assembly as defined in claim 4, said second lid member being pivotally connected to said receptable about a marginal edge of said receptacle extending generally parallel to said receptable pivot axis, said last named pivotal connection being releasable so as to permit said second lid member to move away from said opening by pivoting about said first pivotal connection under the influence of gravity when said container is in said second position.

6. A refuse container assembly as defined in claim 5, said lid assembly including a pair of arms for pivotally interconnecting said first lid member to said hopper section, said arms being disposed on opposite sides of said first lid member, corresponding one ends of each arm being pivotally connected to said receptacle and corresponding other ends being pivotally connected to said first lid member, the pivot axis of said connections being parallel to the pivot axis of said receptacle.

7. A refuse container assembly as defined in claim 6, said actuating means being operable to pivot said pair of arms about said corresponding one ends of said pair of arms so as to move said lid members away of said opening and permit charging of said container.

8. A refuse container as defined in claim 6, further including a second pair of arms positioned on opposite sides of said lid member and each being associated with oen of said first mentioned pair of arms, one end of each of said second pair of arms being pivotally connected to said receptacle and the other end thereof being connected to the associated one of said first mentioned pair of arms, and said actuating means being connected to said second pair of arms, whereby said actuating means being operable to pivot said second pair of arms the latter being operable to pivot said first mentioned pair of arms.

9. A refuse container assembly as defined in claim 8, said second actuating means being a pair of hydraulic cylinder means, one mounted on either side of said container.

10. A refuse container assembly as defined in claim 8, said receptacle including a pair of spaced side walls and a rear wall interconnecting said side walls, said opening being defined by the marginal edges of said spaced side walls, rear wall and an edge of said storage chamber extending parallel to the marginal edge of said rear wall.

11. A refuse container as defined in claim 10, said first and second pair of arms being connected to said side walls.

12. A refuse container as defined in claim 5, said lid assembly further including an articulated chute for manually feeding small quantities of refuse into said container.

13. A refuse container assembly as defined in claim 12, said chute being formed in said first lid member.

14. A refuse container assembly as defined in claim 1, said transfer station including a ramp leading from a roadway to a position adjacent said opening of said receptacle to permit refuse collection vehicles to discharge into said receptacle, said ramp extending generally perpendicularly to the pivot axis of said container.

15. A refuse container assembly as defined in claim 14, said transfer station including a further roadway adjacent said container on the opposite side of said container from said ramp, for use by large capacity transportation vehicles.

16. A refuse container assembly as defined in claim 1.

said support means including a horizontal shaft extending generally transversely of said receptacle;

said receptacle having a rear wall and being pivotally mounted on said shaft adjacent the upper end of said rear wall.

17. A refuse container assembly as defined in claim 1, said lid assembly including:

first, second and third lid members each adapted to overlie a portion of said opening in said first position of said lid assembly;

said first lid member overlying the portion of said opening in said rear wall and being pivotally connected to said receptacle adjacent a lower marginal edge of said portion of said opening;

said second lid member overlying the portion of said opening between said extensions, and being pivotally connected along its rear marginal edge to the upper marginal edge of said first lid member, the front end of said second lid member being movably supported upon said upper marginal edge of each of said extensions;

said third lid member overlying the portion of said opening in said front wall and being pivotally connected along its rear marginal edge to the front marginal edge of said second lid member; the front end of said third lid member being movably supported on the front marginal edge of each said extensions;

said first actuating means being operable to pivot said lid members relative to one another and move said second and third lid members rearwardly on said marginal edges of said extensions to uncover said opening and permit charging of said receptacle.

18. A refuse container assembly as defined in claim 17, said second and third lid members having rollers engageable with the marginal edges of each said extensions.

19. A refuse container assembly as defined in claim 17, said second lid member having a gate member moveable to an open position under the influence of gravity for discharging said receptacle.

20. A refuse container assembly as defined in claim 19, said gate member being coplanar with said second lid member in a closed position and being pivotally connected thereto.

21. A refuse container assembly as defined in claim 20, said gate member being biased toward a closed position under the influence of gravity.

22. An assembly as defined in claim 1, said second arm means including a pair of arms, each said arm having one end secured to said support frame for pivotal movement about said receptacle pivot axis;

said first hydraulic cylinder means including a first pair of hydraulic cylinders, each said cylinder of said first pair of hydraulic cylinders being associated with one of said arms; and said second hydraulic cylinder means including a second pair of hydraulic cylinders, each said cylinder of said second pair of cylinders being associated with one of said arms.

23. An assembly as defined in claim 22, each said hydraulic cylinder being operable in the plane of movement of its associated arm.

24. An assembly as defined in claim 23, said receptacle having a rear wall and said receptacle pivot axis being spaced rearwardly of the upper end of said rear wall.

25. An assembly as defined in claim 24, further including second arm means extending rearwardly of said receptacle and connecting said receptacle to said support frame for pivotal movement of said receptacle about said receptacle pivot axis.

26. An assembly as defined in claim 1, said assembly further including a hopper defining said opening.

27. An assembly as defined in claim 26, said hopper including means for preventing spillage of refuse material during charging and discharging of said receptacle.

28. An assembly as defined in claim 27, said spillage preventing means including extensions of opposed side walls of said receptacle.

29. A refuse container assembly as defined in claim 1, each said side wall having an extension projecting beyond said front and rear walls and defining with said front and rear walls a generally inverted, U-shaped refuse material intake and disharge opening; and a lid assembly adapted to overlie said opening and being movable between a first position normally closing said opening and a second position uncovering at least a portion of said opening to permit charging of said chamber in said lower position of said receptacle and including means permitting discharging of said chamber; and means for actuating said lid assembly.

* * * * *